US011892169B2

(12) United States Patent
Itoh et al.

(10) Patent No.: US 11,892,169 B2
(45) Date of Patent: Feb. 6, 2024

(54) GAS TURBINE COMBUSTOR STRUCTURE

(71) Applicant: TOSHIBA ENERGY SYSTEMS & SOLUTIONS CORPORATION, Kawasaki (JP)

(72) Inventors: Masao Itoh, Kanagawa (JP); Yasunori Iwai, Kanagawa (JP); Takashi Sasaki, Kanagawa (JP); Yuichi Morisawa, Kanagawa (JP); Hiroki Kasuya, Kanagawa (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/562,395

(22) Filed: Dec. 27, 2021

(65) Prior Publication Data

US 2022/0120442 A1 Apr. 21, 2022

Related U.S. Application Data

(63) Continuation of application No. PCT/JP2020/041064, filed on Nov. 2, 2020.

(30) Foreign Application Priority Data

Nov. 8, 2019 (JP) ................................. 2019-203047

(51) Int. Cl.
*F23R 3/46* (2006.01)
*F23R 3/00* (2006.01)
(Continued)

(52) U.S. Cl.
CPC ................ *F23R 3/46* (2013.01); *F23R 3/002* (2013.01); *F23R 3/02* (2013.01); *F23R 3/38* (2013.01)

(58) Field of Classification Search
CPC .... F02C 1/08; F02C 3/34; F23R 3/002; F23R 3/02; F23R 3/42; F23R 3/46; F23R 2900/03342
See application file for complete search history.

(56) References Cited

U.S. PATENT DOCUMENTS 3,088,279 A * 5/1963 Diedrich ................... F23R 3/42
60/726
4,073,134 A * 2/1978 Koch ........................ F23R 3/34
60/39.23
(Continued)

FOREIGN PATENT DOCUMENTS

GB 0 715 387 A 9/1954
JP H04-100660 U 8/1992
(Continued)

OTHER PUBLICATIONS

Extended Search Report for corresponding EP Patent Application 20884994.3, dated Oct. 25, 2023, 8 pages.

Primary Examiner — Scott J Walthour
(74) Attorney, Agent, or Firm — Foley & Lardner LLP

(57) ABSTRACT

A combustor structure of an embodiment is disposed to penetrate, from a direction perpendicular to an axial direction of a turbine rotor in a supercritical $CO_2$ gas turbine which uses supercritical $CO_2$ for a working fluid, a casing of the supercritical $CO_2$ gas turbine. The combustor structure includes a plurality of combustors. Each of the combustors includes: a combustor liner in a cylindrical shape, which combusts fuel and an oxidant; a fuel supply part which is provided at an upstream end of the combustor liner and supplies the fuel into the combustor liner; and an oxidant supply part which is provided at the upstream end of the combustor liner and supplies the oxidant into the combustor liner.

8 Claims, 7 Drawing Sheets

(51) Int. Cl.
*F23R 3/02* (2006.01)
*F23R 3/38* (2006.01)

(56) References Cited

U.S. PATENT DOCUMENTS

| | | | |
|---|---|---|---|
| 5,259,184 A | 11/1993 | Borkwicz et al. | |
| 6,094,916 A | 8/2000 | Puri et al. | |
| 6,374,594 B1 * | 4/2002 | Kraft | F23R 3/46 60/732 |
| 2010/0077719 A1 | 4/2010 | Wilson et al. | |
| 2015/0121898 A1 | 5/2015 | Tashima et al. | |
| 2017/0342860 A1 | 11/2017 | Morisawa et al. | |
| 2018/0023478 A1 | 1/2018 | Toshiba | |
| 2020/0025089 A1 | 1/2020 | Nakamura et al. | |

FOREIGN PATENT DOCUMENTS

| | | |
|---|---|---|
| JP | H06-18037 A | 1/1994 |
| JP | 2005-042973 A | 2/2005 |
| JP | 2014-37825 A | 2/2014 |
| WO | WO-2016/139696 A1 | 9/2016 |
| WO | WO 2018/173122 A1 | 9/2018 |

* cited by examiner

GAS TURBINE COMBUSTOR STRUCTURE

CROSS REFERENCE TO RELATED APPLICATIONS

This application is based upon and claims the benefit of priority from Japanese Patent Application No. 2019-203047, filed on Nov. 8, 2019; the entire contents of which are incorporated herein by reference.

FIELD

An embodiment of the present invention relates to a gas turbine combustor structure.

BACKGROUND

A gas turbine combustor includes a fuel-oxidant supply mechanism which supplies fuel and an oxidant to a combustion area. As the fuel-oxidant supply mechanism, there are a supply mechanism providing a diffusion combustion system and a supply mechanism providing a premixed combustion system. The supply mechanism providing a diffusion combustion system includes, for example, a fuel supply part which supplies the fuel and an oxidant supply part which supplies the oxidant from around the fuel supply part. The supply mechanism providing a premixed combustion system includes, for example, a mixed gas supply part which ejects a mixed gas of the fuel and the oxidant.

Because the fuel-oxidant supply mechanism is designed in a predetermined optimum size, a fuel flow rate allowed to be supplied from one fuel-oxidant supply mechanism is limited. Hence, including a plurality of fuel-oxidant supply mechanisms is essential for securing a heat quantity required as the gas turbine combustor.

As a conventional gas turbine combustor, for example, there is a cannular combustor in which a plurality of combustion liners each including one fuel-oxidant supply mechanism are arranged in a circumferential direction of a turbine rotor. Further, as a conventional gas turbine combustor, for example, there is an annular combustor including an annular liner provided around a turbine rotor and a plurality of fuel-oxidant supply mechanisms arranged in a circumferential direction at an upstream end of the annular liner.

Here, most of the conventional gas turbine combustors are disposed to penetrate a casing at an angle of about 0 to 30 degrees with an axial direction of the turbine rotor, for example.

In recent years, in power generation plant including such a gas turbine combustor as described above, increasing efficiency is in progress in response to demands for reduction of carbon dioxide, resource conservation, and the like. Under such circumstances, a supercritical $CO_2$ gas turbine in which a part of carbon dioxide produced in the combustor is pressurized to a supercritical pressure to be circulated through the combustor is under consideration.

Because the supercritical $CO_2$ gas turbine is in operating conditions under a superhigh-pressure environment, the adoption of a double casing structure including an inner casing and an outer casing is essential.

When the displacement configuration of the above-described conventional gas turbine combustors is adopted to the supercritical $CO_2$ gas turbine including the double casing structure, the gas turbine combustors are each disposed to penetrate the outer casing and the inner casing at the above-described predetermined angle with the axial direction of the turbine rotor.

In this case, a thermal expansion difference between the outer casing and the inner casing makes it difficult to maintain sealing performance between the outer casing and the inner casing. Hence, a vertical silo-type combustor easy to maintain the sealing performance also in the double casing structure is adopted to such a supercritical $CO_2$ gas turbine. In the vertical silo-type combustor, the combustor is inserted from a vertically upper side or a vertically lower side of the outer casing. That is, the vertical silo-type combustor is disposed to penetrate the outer casing and the inner casing at an angle of 90 degrees with the axial direction of the turbine rotor.

Further, in the combustor of the supercritical $CO_2$ gas turbine, combustor inlet conditions are of superhigh pressure and high temperatures. Moreover, in the combustor of the supercritical $CO_2$ gas turbine, because a part of a combustion gas is circulated, flow rates of fuel and oxygen are set to a stoichiometric mixture ratio (equivalence ratio 1) so as to prevent excess fuel and oxygen from remaining in the combustion gas discharged from the combustor.

Under such conditions, when a premixed combustion system is adopted to the cumbustor of the supercritical $CO_2$ gas turbine, a premixed gas before being ejected to a combustion area is sometimes ignited automatically in a premixed gas supply pipe. Hence, a diffusion combustion system is adopted to the combustor of the supercritical $CO_2$ gas turbine.

As described above, in the supercritical $CO_2$ gas turbine, the vertical silo-type combustor providing the diffusion combustion system is adopted. Here, FIG. 7 is a view schematically illustrating a longitudinal section of a conventional vertical silo-type combustor 200 providing a diffusion combustion system.

As illustrated in FIG. 7, the vertical silo-type combustor 200 includes a plurality of fuel-oxidant supply mechanisms 202 at an upstream end of one combustion liner 201. Each of the fuel-oxidant supply mechanisms 202 includes a fuel supply part 203 which supplies fuel and an oxidant supply part 204 which supplies an oxidant.

In the vertical silo-type combustor 200, the fuel and the oxidant ejected from each of the fuel-oxidant supply mechanisms 202 are combusted in one space in the combustion liner 201. As illustrated in FIG. 7, downstream from each of the fuel-oxidant supply mechanisms 202, flames 205 are each formed.

In such a conventional vertical silo-type combustor 200, a flow field of the fuel and the oxidant ejected from the fuel-oxidant supply mechanism 202 is affected by flow fields of the fuel and the oxidant ejected from other adjacent fuel-oxidant supply mechanisms 202.

For example, the flow field caused by the fuel and the oxidant ejected from one fuel-oxidant supply mechanisms 202 is disturbed by the flow fields of the fuel and the oxidant ejected from the adjacent fuel-oxidant supply mechanisms 202. This makes the flame 205 formed by the one fuel-oxidant supply mechanisms 202 unstable to cause blow-off or unstable combustion.

For example, when a swirling component is imparted to a flow of the oxidant ejected from the oxidant supply part 204, a flow field having a recirculation flow is formed downstream from the fuel-oxidant supply mechanism 202.

In general, by forming the recirculation flow downstream from the fuel-oxidant supply mechanism, stable flame can be obtained. However, in the conventional vertical silo-type combustor 200 illustrated in FIG. 7, the recirculation flows formed downstream from the adjacent fuel-oxidant supply mechanisms 202 interfere with one another to disturb the recirculation flows. This makes the flames 205 unstable to cause the blow-off or the unstable combustion.

For example, when the unstable combustion is caused, a concentration of unburnt components in a combustion gas increases to decrease combustion efficiency. Hence, a required heat quantity cannot be obtained, and carbon dioxide to be circulated to the combustor contains oxygen and the unburnt components.

DETAILED DESCRIPTION

Hereinafter, an embodiment of the present invention will be described in reference to the drawings.

In one embodiment, a gas turbine combustor structure is disposed to penetrate, from a direction perpendicular to an axial direction of a turbine rotor in a supercritical $CO_2$ gas turbine which uses supercritical $CO_2$ for a working fluid, a casing of the supercritical $CO_2$ gas turbine. The gas turbine combustor structure includes a plurality of combustors, and each of the combustors includes: a combustor liner in a cylindrical shape, which combusts fuel and an oxidant; a fuel supply part which is provided at an upstream end of the combustor liner and supplies the fuel into the combustor liner; and an oxidant supply part which is provided at the upstream end of the combustor liner and supplies the oxidant into the combustor liner.

Figure 1:
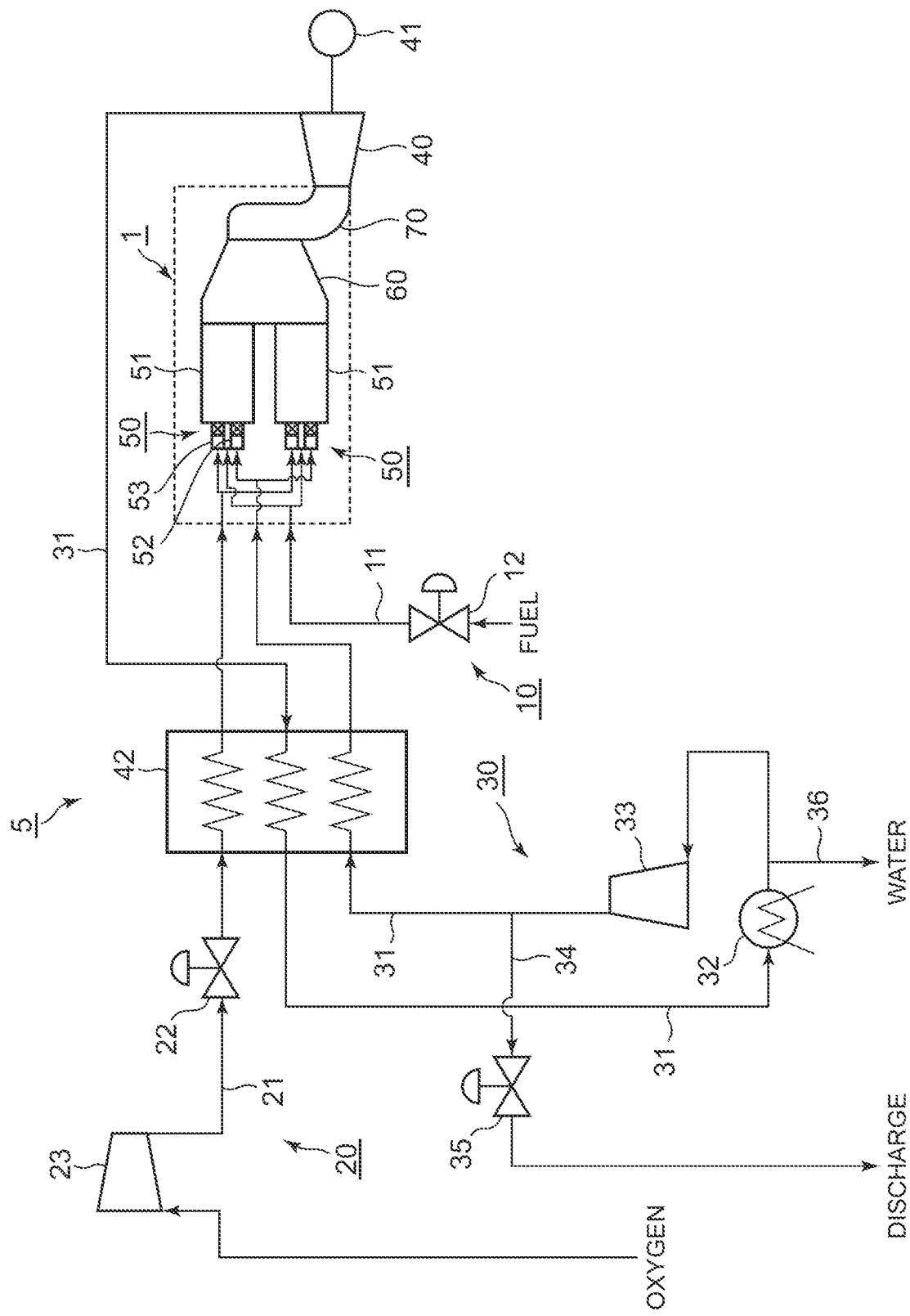
FIG. 1 is a system diagram of a gas turbine facility including a combustor structure of an embodiment.

FIG. 1 is a system diagram of a gas turbine facility 5 including a combustor structure 1 of the embodiment. As illustrated in FIG. 1, the gas turbine facility 5 includes the combustor structure 1, a fuel supply system 10, an oxygen supply system 20, a carbon dioxide circulation system 30, a turbine 40, a generator 41, and a heat exchanger 42. Note that the combustor structure 1 functions as a gas turbine combustor structure.

The fuel supply system 10 supplies fuel to the combustor structure 1. The fuel supply system 10 includes a pipe 11. The pipe 11 is provided between a fuel supply source (not illustrated) and the combustor structure 1. Further, the pipe 11 includes a flow rate regulating valve 12 which regulates a flow rate of the fuel.

Here, as the fuel, for example, hydrocarbon such as methane or natural gas is used. Further, as the fuel, for example, a coal gasification gas fuel containing carbon monoxide, hydrogen, and the like can also be used.

The oxygen supply system 20 supplies oxygen to the combustor structure 1. The oxygen supply system 20 includes a pipe 21. The pipe 21 is provided between an air separating apparatus (not illustrated) which separates oxygen from the air and the combustor structure 1.

The pipe 21 includes a flow rate regulating valve 22 which regulates a flow rate of the oxygen. Further, the pipe 21 includes a compressor 23 which pressurizes the oxygen. The flow rate regulating valve 22 is provided between the compressor 23 and the heat exchanger 42. Then, the pipe 21 is provided to extend through the heat exchanger 42 to the combustor structure 1. Note that because the flow rate regulating valve 22 is provided on a more upstream side than the heat exchanger 42, high-temperature oxygen does not flow through the flow rate regulating valve 22.

The oxygen separated from the air by the air separating apparatus (not illustrated) flows through the pipe 21. The oxygen flowing through the pipe 21 is heated by passing through the heat exchanger 42 to be supplied to the combustor structure 1.

The carbon dioxide circulation system 30 circulates a part of a combustion gas discharged from the turbine 40 to the combustor structure 1. The carbon dioxide circulation system 30 includes a pipe 31. The pipe 31 is provided between an outlet of the turbine 40 and the combustor structure 1.

The pipe 31 includes a condenser 32 which removes water vapor contained in the combustion gas. Note that the water vapor in the combustion gas passes through the condenser 32, thereby condensing into water. The water is discharged through a pipe 36 to the outside, for example.

Further, the pipe 31 includes a compressor 33 which pressurizes the combustion gas from which the water vapor has been removed in the condenser 32 to a critical pressure or more. The condenser 32 and compressor 33 are included in the pipe 31 in an area where the combustion gas cooled by the heat exchanger 42 flows.

Here, in the gas turbine facility 5, excess oxygen and fuel preferably do not remain in the combustion gas discharged from the combustor structure 1 (combustor 50). Thus, the flow rates of the fuel and the oxygen are regulated so as to have a stoichiometric mixture ratio (equivalence ratio 1). Further, a medium circulated to the combustor structure 1 is carbon dioxide.

Note that the equivalence ratio which is mentioned here is an equivalence ratio calculated on the basis of the fuel flow rate and the oxygen flow rate. In other words, it is an equivalence ratio when it is assumed that the fuel and the oxygen are uniformly mixed (overall equivalence ratio).

Therefore, most of components of the combustion gas from which the water vapor has been removed in the condenser 32 (dry combustion gas) are carbon dioxide. Thus, the combustion gas from which the water vapor has been removed is simply referred to as carbon dioxide.

Note that, for example, a slight amount of carbon monoxide of 0.2% or less is sometimes mixed in the combustion gas from which the water vapor has been removed, but also in this case, the combustion gas from which the water vapor has been removed is simply referred to as carbon dioxide. Further, the carbon dioxide pressurized to the critical pressure or more becomes a supercritical fluid.

The pipe 31 is disposed to pass through the heat exchanger 42 twice. That is, the pipe 31 passes through the heat exchanger 42 once between the turbine 40 and the condenser 32. Then, the pipe 31 passes through the heat exchanger 42 again between the compressor 33 and the combustor structure 1.

Here, the combustion gas discharged from the turbine 40 is cooled by passing through the heat exchanger 42. At this time, the oxygen flowing through the pipe 21 and the carbon dioxide passing through the pipe 31 and circulating to the combustor structure 1, which are previously described, are heated by heat release from the combustion gas.

Further, the pipe 31 branches between the compressor 33 and the heat exchanger 42. The pipe 34 branched from the pipe 31 includes a flow rate regulating valve 35 which regulates a flow rate of carbon dioxide to be discharged to the outside. Note that the carbon dioxide discharged to the outside can be utilized for EOR (Enhanced Oil Recovery) employed at an oil drilling field, for example.

As illustrated in FIG. 1, one end side (combustor structure 1 side) of the pipe 11 which supplies the fuel is branched in plurality. Then, the branched pipes 11 are connected to the combustors 50 of the combustor structure 1.

Figure 2:
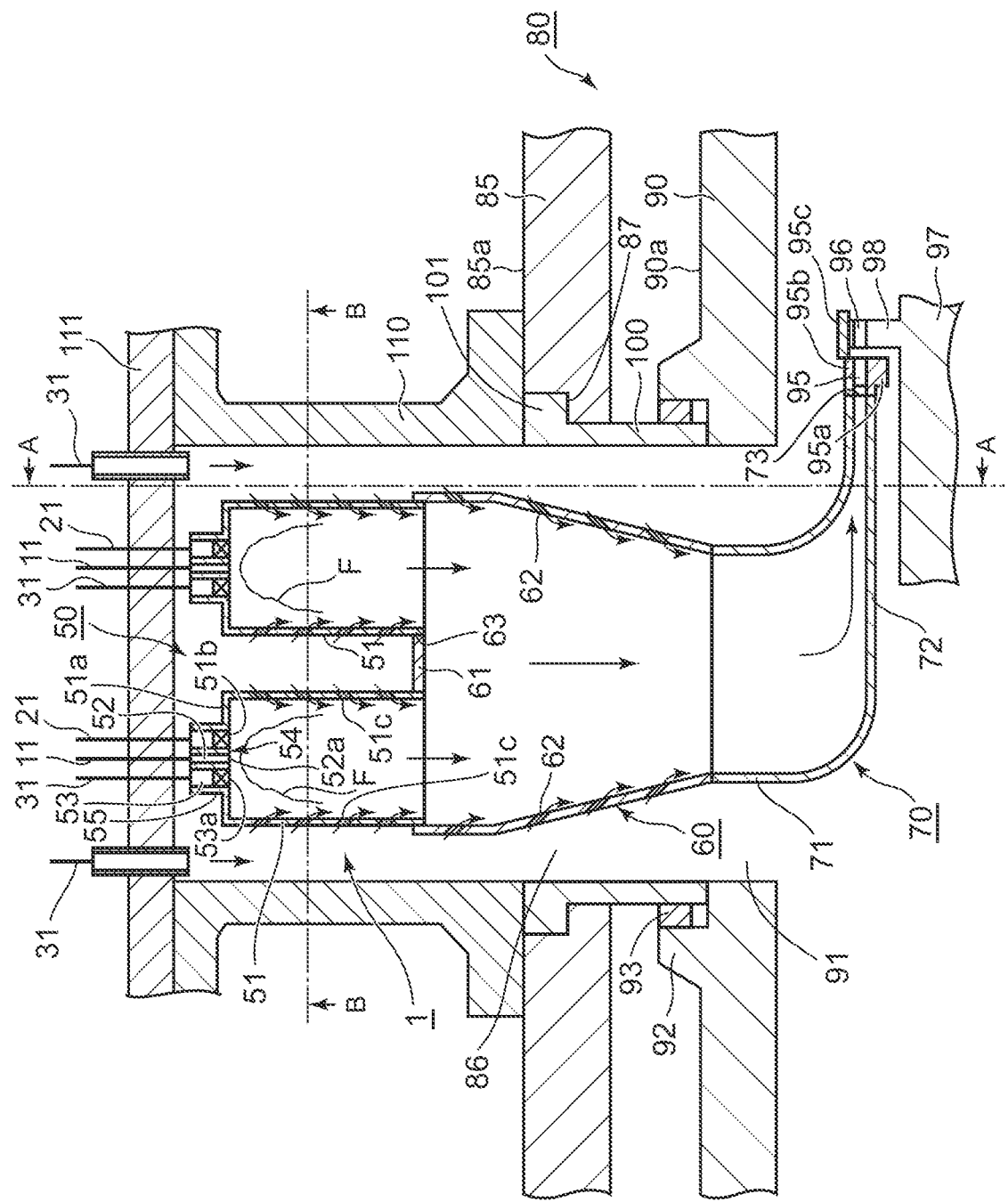
FIG. 2 is a view illustrating a longitudinal section of the combustor structure of the embodiment.

Further, one end side (combustor structure 1 side) of the pipe 31 which circulates the carbon dioxide to the combustor structure 1 is branched in plurality, for example. Supercritical $CO_2$ supplied from a part of the branched pipes 31 is used for forming an oxidant which is a mixed gas of the supercritical $CO_2$ and oxygen. The rest of the branched pipes 31 are used for introducing the supercritical $CO_2$ around the combustor structure 1 as a cooling medium as illustrated in FIG. 2 described later.

One end side (combustor structure 1 side) of the pipe 21 which supplies the oxygen to the combustor structure 1 is branched in plurality.

Then, one of the branched pipes 31 and one of the branched pipes 21 are connected to an oxidant supply part 53 of each of the combustors 50. Then, the oxygen and the supercritical $CO_2$ which are introduced to the oxidant supply part 53 are mixed to form the mixed gas. This mixed gas is ejected into a combustor liner 51 as an oxidant.

Note that a method for forming the mixed gas is not limited to this method. For example, a mixing chamber formed of a casing member having a space inside may be included. In this case, a part of the branched pipes 31 and a part of the branched pipes 21 are connected to the mixing chamber. Then, the mixed gas formed in the mixing chamber is supplied through a pipe to the oxidant supply part 53 of each of the combustors 50.

Further, the pipe 31 may be branched between the heat exchanger 42 and the combustor structure 1 to couple the branched pipe to the pipe 21 through which the oxygen flows. This coupling portion is provided in the pipe 21 between the heat exchanger 42 and the combustor structure 1, for example.

Further, the pipe 31 may be branched between the compressor 33 and the heat exchanger 42 to couple the branched pipe to the pipe 21 through which the oxygen flows. This coupling portion is provided in the pipe 21 between the flow rate regulating valve 22 and the heat exchanger 42, for example.

In either case of providing the coupling portion, the pipe branched from the pipe 31 includes a flow rate regulating valve which regulates a flow rate of the supercritical $CO_2$ to be mixed with the oxygen.

Note that when the pipe 31 branched between the compressor 33 and the heat exchanger 42 is coupled to the pipe 21 between the flow rate regulating valve 22 and the heat exchanger 42, the mixed gas of the oxygen and the supercritical $CO_2$ is heated by the heat exchanger 42 to be supplied to the combustor structure 1. Hence, oxidization of the pipe 21, or the like can be suppressed as compared with a case where high-temperature pure oxygen flows through the pipe 21.

The turbine 40 is rotationally moved by the combustion gas discharged from the combustor structure 1. To the turbine 40, for example, a generator 41 is connected.

Next, a configuration of the combustor structure 1 will be described.

Figure 3:
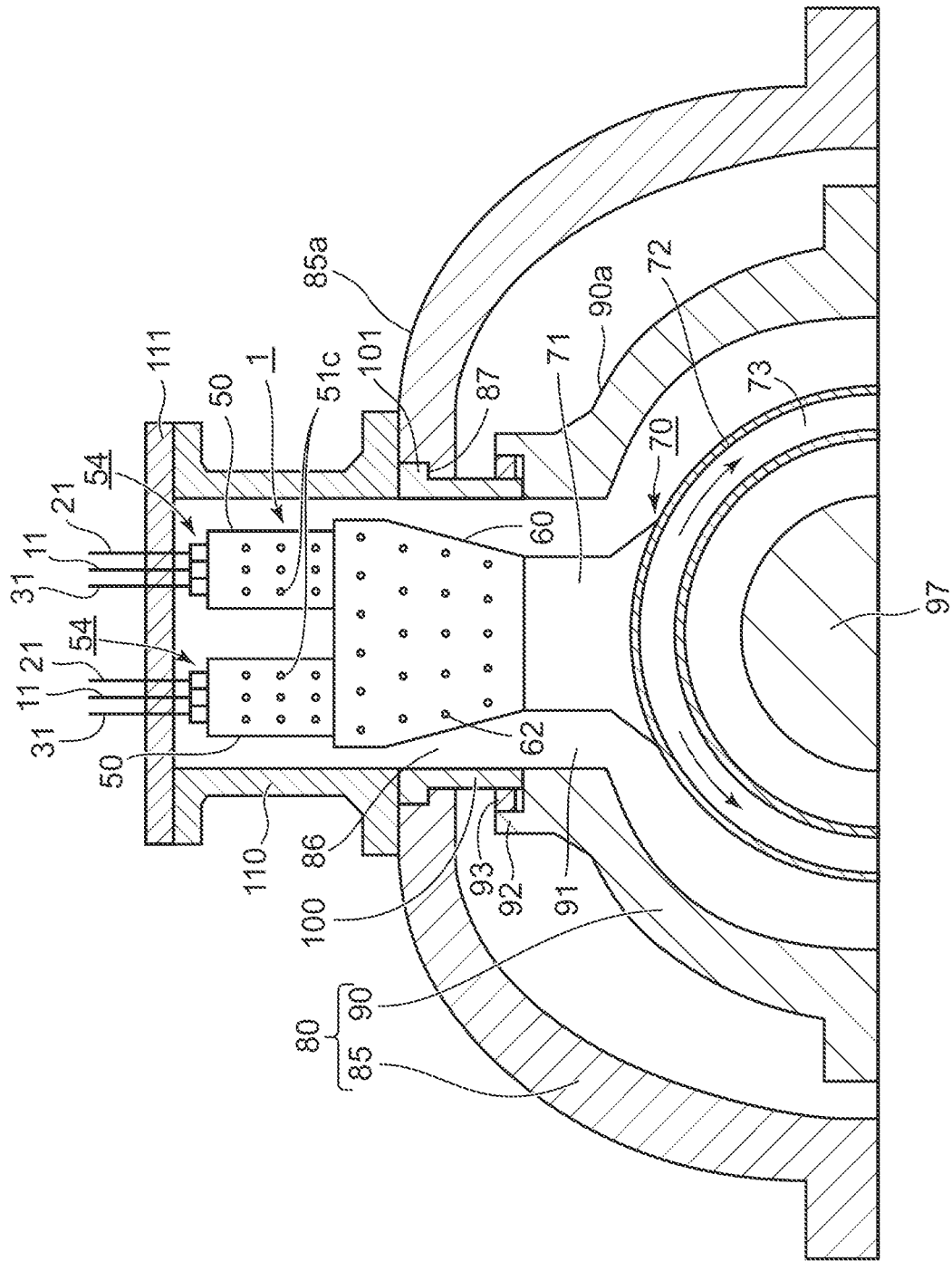
FIG. 3 is a view illustrating an A-A cross section in FIG. 2.
Figure 4:
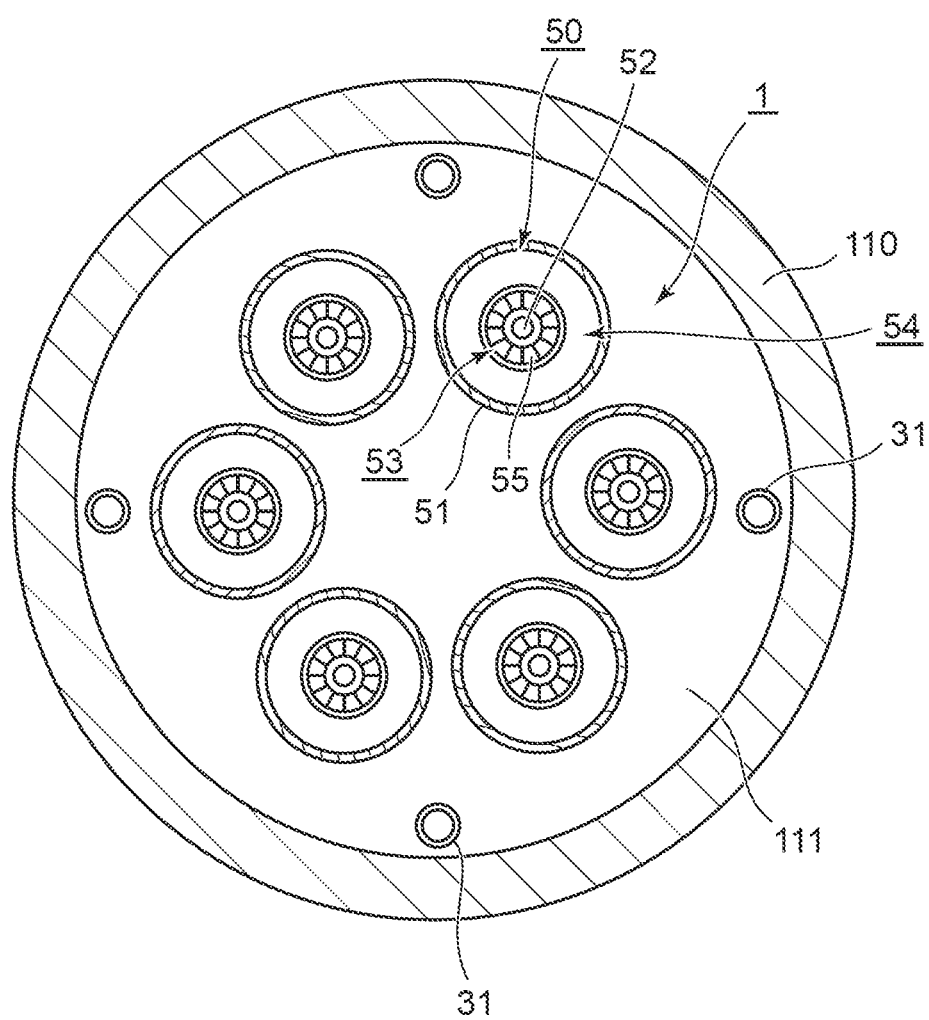
FIG. 4 is a view illustrating a B-B cross section in FIG. 2.

FIG. 2 is a view illustrating a longitudinal section of the combustor structure 1 of the embodiment. FIG. 3 is a view illustrating an A-A cross section in FIG. 2. FIG. 4 is a view illustrating a B-B cross section in FIG. 2. Note that the combustor structure 1 illustrated in FIG. 2-FIG. 4 is illustrated by the sectional views in a state of being installed in the gas turbine. Hence, FIG. 2-FIG. 4 also illustrate a configuration of a casing of the gas turbine, or the like, for example. Further, FIG. 2 and FIG. 3 illustrate a configuration on an upper half side. Here, one example of including the combustor structure 1 on the upper half side is indicated.

Here, the combustor structure 1 is installed in a supercritical $CO_2$ gas turbine which uses the supercritical $CO_2$ for a working fluid. Since the combustor structure 1 and the turbine 40 are operated under a condition of a superhigh pressure, a casing 80 is constituted by a double casing structure including an inner casing 90 and an outer casing 85 as illustrated in FIG. 2 and FIG. 3. The outer casing 85 is provided on an outer peripheral side of the inner casing 90 with a predetermined gap therebetween.

In the inner casing 90, stator blades 95 and rotor blades 96 are arranged alternately in an axial direction of a turbine rotor 97. The stator blade 95 is arranged between an inner ring sidewall 95a and an outer ring sidewall 95b. The rotor blade 96 is provided on a rotor wheel 98 of the turbine rotor 97. Note that an outer wall 95c is provided around an outer periphery of the rotor blade 96 with a gap between a tip of the rotor blade and the outer wall 95c. The outer wall 95c may be formed by extending the outer ring sidewall 95b in the axial direction of the turbine rotor 97, for example.

The combustor structure 1 includes the combustor 50, a rear liner 60, and a scroll 70. Further, the combustor structure 1 includes a plurality of combustors 50.

The combustor structure 1 is disposed to penetrate the outer casing 85 and the inner casing 90 from a direction perpendicular to the axial direction of the turbine rotor 97 as illustrated in FIG. 2 and FIG. 3. The combustor structure 1 is, what is called, a vertical silo-type combustor structure. Here, one example of making the combustor structure 1 penetrate from a vertically upper side is indicated.

Outside the outer casing 85, a combustor casing 110 surrounding the combustor structure 1 is provided. The combustor casing 110 is constituted by a cylindrical casing whose both ends are open.

One end of the combustor casing 110 is fixed on the outer casing 85. The other end of the combustor casing 110 is closed by a head plate 111. Note that, for example, in the head plate 111, through holes (not illustrated) for pulling the pipes 21, the pipes 31, and the pipes 11 into the combustor casing 110 are provided.

In the outer casing 85 and the inner casing 90, through openings 86, 91 for making the combustor structure 1 penetrate are formed. A sleeve 100 is provided between the outer casing 85 and the inner casing 90 which make the combustor structure 1 penetrate.

The sleeve 100 prevents the supercritical $CO_2$ as the cooling medium flowing around the combustor structure 1 from flowing out in a space between the outer casing 85 and the inner casing 90. The sleeve 100 is constituted by a cylindrical member, for example.

For example, an upstream end of the sleeve 100 includes an annular flange portion 101 projecting to an outer peripheral side. The flange portion 101 is supported by an annular groove portion 87 formed in an outer peripheral surface 85a of the outer casing 85. Further, a downstream end of the sleeve 100 is made to abut on an outer peripheral surface 90a of the inner casing 90.

Further, on the outer peripheral surface 90a of the inner casing 90 abutting on the sleeve 100, a circular ridge portion 92 is formed over the periphery of the sleeve 100 apart from the sleeve 100. The ridge portion 92 projects to the outer casing 85 side.

Between the sleeve 100 and the ridge portion 92, a circular seal ring 93 is fitted. Including the seal ring 93 prevents the supercritical $CO_2$ flowing around the combustor structure 1 from flowing out from between the sleeve 100 and the outer peripheral surface 90a of the inner casing 90 to between the outer casing 85 and the inner casing 90.

Note that a configuration of the sleeve 100 is not limited to the above-described configuration. The configuration of the sleeve 100 only needs to be capable of preventing the supercritical $CO_2$ flowing around the combustor structure 1 from flowing out in the space between the outer casing 85 and the inner casing 90.

The combustor 50 includes the combustor liner 51, a fuel supply part 52, and the oxidant supply part 53.

The combustor liner 51 is constituted by a cylindrical member in which the fuel and the oxidant are combusted. One end (upstream end) of the combustor liner 51 is blocked by an upstream end wall 51a, and the other end (downstream end) thereof is opened. The combustor liner 51 is constituted by a linearly extending cylinder body or the like, for example. Note that the combustor liner 51 may be constituted by a partially curved cylinder body or the like, for example. The upstream end wall 51a has an opening 51b for providing the fuel supply part 52 and the oxidant supply part 53.

Incidentally, the upstream means an upstream in a direction in which the combustion gas flows, and the downstream means a downstream in the direction in which the combustion gas flows.

As illustrated in FIG. 2 and FIG. 3, the combustor liner 51 is disposed so that a center axis of the combustor liner 51 is perpendicular to the axial direction of the turbine rotor 97, for example.

Further, a sidewall of the combustor liner 51 is provided with a plurality of introduction holes 51c for guiding the supercritical $CO_2$ flowing outside the combustor liner 51 to the interior thereof. This supercritical $CO_2$ flowing outside the combustor liner 51 has a function of cooling the combustor liner 51.

Note that the introduction hole 51c is constituted by a slit, a hole, or the like, for example. The combustor liner 51 is cooled by film cooling or the like, for example. When the film cooling is applied, the supercritical $CO_2$ which is the cooling medium introduced from the introduction holes 51c forms a heat insulating film of gas between an inner wall surface of the combustor liner 51 and the combustion gas. This suppresses direct contact of the inner wall surface of the combustor liner 51 with the combustion gas.

The fuel supply part 52 supplies the fuel into the combustor liner 51. The fuel supply part 52 is provided in the upstream end wall 51a of the combustor liner 51. The fuel supply part 52 is provided at the center of the upstream end wall 51a, as illustrated in FIG. 2, for example.

The fuel supply part 52 is constituted by a cylindrical tube or the like, for example. The fuel supply part 52 is coupled to the pipe 11 which supplies the fuel. An outlet 52a of the fuel supply part 52 provides a function as a fuel nozzle, for example. The outlet 52a is constituted by a fuel injection hole having a single-hole, a fuel ejection hole having multi-hole, or the like, for example. The fuel is ejected from the outlet 52a of the fuel supply part 52 into the combustor liner 51.

The oxidant supply part 53 supplies the oxidant into the combustor liner 51. The oxidant supply part 53 is provided in the upstream end wall 51a of the combustor liner 51. The oxidant supply part 53 is provided concentrically with the fuel supply part 52 and annularly around the fuel supply part 52, as illustrated in FIG. 2, for example. The annular oxidant supply part 53 is formed by providing a cylindrical tube around the outer periphery of the fuel supply part 52, for example.

Thus, for example, the fuel supply part 52 and the oxidant supply part 53 are formed in a double-tube structure. The fuel is ejected from the central fuel ejection hole and the oxidant is ejected from the annular flow path formed around the central fuel ejection hole. That is, to the combustor 50, a diffusion combustion system is adopted.

At an annular outlet 53a of the oxidant supply part 53, for example, a swirler 55 which imparts a swirling component to a flow of the oxidant, or the like is provided. The oxidant passes through the swirler 55, and thereby a flow having the swirling component is ejected into the combustor liner 51. Thus, imparting the swirling component to the flow of the oxidant causes mixture of the fuel and the oxidant to be promoted to form stable flame in the combustor liner 51.

The above-described fuel supply part 52 and oxidant supply part 53 constitute one fuel-oxidant supply mechanism 54. Then, as illustrated in FIG. 2, on a downstream side of this one fuel-oxidant supply mechanism 54, one flame F is formed. That is, the combustor 50 includes one combustor liner 51 and one fuel-oxidant supply mechanism 54 provided at the upstream end of this one combustor liner 51.

Note that here, one example of the fuel-oxidant supply mechanism 54 constituted of one fuel supply part 52 and one oxidant supply part 53 is indicated, but this configuration is not restrictive.

The fuel-oxidant supply mechanism 54 only needs to be configured to form one flame F, in other words, one combustion area, formed by the fuel and the oxidant ejected from the fuel-oxidant supply mechanism 54, downstream from the one fuel-oxidant supply mechanism 54. For example, the one fuel-oxidant supply mechanism 54 may include a plurality of fuel supply parts 52 and a plurality of oxidant supply parts 53.

The combustor structure 1 includes a plurality of combustors 50 each including the above-described configuration. As illustrated in FIG. 4, the plurality of combustors 50 are provided in the combustor casing 110. As illustrated in FIG. 4, the plurality of combustors 50 are arranged at regular intervals in a circumferential direction centered at a center axis of the combustor casing 110, for example. The number of the arranged combustors 50 is determined on the basis of a heat quantity allowed to be supplied from the one combustor 50 and a heat quantity required for the supercritical $CO_2$ gas turbine, for example.

The downstream ends of the combustor liners 51 of the combustors 50 are communicated with through openings 63 in an upstream end wall 61 provided at an upstream end of a later-described rear liner 60 as illustrated in FIG. 2. Then, the combustor liners 51 are communicated through the through openings 63 into the rear liner 60.

Here, as illustrated in FIG. 1 and FIG. 2, the fuel supply parts 52 of the combustors 50 are each coupled to the branched pipe 11. The oxidant supply parts 53 of the combustors 50 are each coupled to the branched pipe 21 and pipe 31, for example. The oxygen and the supercritical $CO_2$ introduced in an upstream portion of the oxidant supply part 53 are mixed while flowing in the oxidant supply part 53 to become the mixed gas made of the oxygen and the supercritical $CO_2$ at the outlet 53a of the oxidant supply part 53, for example.

The rear liner 60 is provided on a downstream side of the plurality of combustors 50. The rear liner 60 is a flow path which guides the combustion gas discharged from the plurality of combustors 50 to the scroll 70 while gathering it and straightening its flow.

As illustrated in FIG. 2 and FIG. 3, the rear liner 60 is constituted by a cylindrical member provided to extend in a direction perpendicular to the axial direction of the turbine rotor 97, for example. Further, the rear liner 60 is constituted by having a flow-path portion whose flow path cross-sectional area gradually decreases toward the downstream side, for example. Note that a shape of the rear liner 60 is not limited to this.

One end (upstream end) of the rear liner 60 is blocked by the upstream end wall 61, and the other end (downstream end) is opened. The upstream end wall 61 has a plurality of through openings 63 communicated with the downstream ends of the combustor liners 51. The through openings 63 are formed to be aligned with positions of the downstream ends of the combustor liners 51. The other end (downstream end) of the rear liner 60 is connected to an upstream end of the scroll 70.

A sidewall of the rear liner 60 is provided with a plurality of introduction holes 62 for guiding the supercritical $CO_2$ flowing outside the rear liner 60 to the interior thereof. This supercritical $CO_2$ flowing outside the rear liner 60 has a function of cooling the rear liner 60.

Note that a configuration of the introduction hole 62 is the same as the previously-described configuration of the introduction hole 51c. Further, an effect by including the introduction holes 62 is the same as the previously-described effect by including the introduction holes 51c.

The scroll 70 is a flow path through which the combustion gas discharged from the rear liner 60 is guided in the axial direction of the turbine rotor 97 and guided in a circumferential direction of the turbine rotor 97.

The scroll 70 includes a bent flow path portion 71 which guides the combustion gas discharged from the rear liner 60 in the axial direction of the turbine rotor 97 and an annular flow path portion 72 which guides the combustion gas guided in the axial direction of the turbine rotor 97 in the circumferential direction of the turbine rotor 97 as illustrated in FIG. 2 and FIG. 3.

An upstream end of the bent flow path portion 71 is connected to the downstream end of the rear liner 60. The bent flow path portion 71 is constituted by a bent pipe bent into about 90 degrees in the axial direction of the turbine rotor 97. Note that an outlet side of the bent flow path portion 71 has a configuration to extend in the circumferential direction of the turbine rotor 97 while being bent. Then, the bent flow path portion 71 biases a flow of the combustion gas discharged from the rear liner 60 to about 90 degrees. The biased flow of the combustion gas flows in the axial direction of the turbine rotor 97.

The annular flow path portion 72 is constituted by an annular pipe provided to cover the periphery of the turbine rotor 97. Note that the annular flow path portion 72 is formed by combining divided structures formed of semi-ring-shaped upper half portion and lower half portion, for example.

The annular flow path portion 72 expands a flow of the combustion gas discharged from the bent flow path portion 71 in the circumferential direction of the turbine rotor 97. In the annular flow path portion 72, the combustion gas having a component of velocity in the axial direction of the turbine rotor 97 expands uniformly in the circumferential direction of the turbine rotor 97.

An outlet 73 of the annular flow path portion 72 (scroll 70) is opposed to a first-stage stator blade 95. Then, the combustion gas flowing in the annular flow path portion 72 is ejected from the outlet 73 toward the first-stage stator blade 95. Note that an outlet end of the annular flow path portion 72 is in contact with upstream ends of the inner ring sidewall 95a and the outer ring sidewall 95b. This causes the combustion gas ejected from the outlet 73 to be guided to the first-stage stator blade 95.

Next, an action in the gas turbine facility 5 and an action in the combustor structure 1 will be described.

First, the action in the gas turbine facility 5 will be described in reference to FIG. 1.

As illustrated in FIG. 1, the fuel is supplied through the pipe 11 to the combustor 50 of the combustor structure 1. The oxygen separated from the air is supplied through the pipe 21 to the combustor 50. At this time, the oxygen is pressurized to a predetermined pressure by the compressor 23. Moreover, the pressurized oxygen is heated by passing through the heat exchanger 42.

Further, the circulating supercritical $CO_2$ is supplied through the pipe 31 to the combustor structure 1 and the combustor 50. At this time, the supercritical $CO_2$ is heated by passing through the heat exchanger 42.

Note that as described previously, the oxygen and the supercritical $CO_2$ supplied to the combustor 50 are mixed and ejected to the combustion area in the combustor liner 51 as the oxidant.

The fuel and the oxidant guided to the combustor 50 of the combustor structure 1 are combusted in the combustor liner 51 to become the combustion gas.

Note that because the action in the combustor structure 1 is described later, a detailed description is omitted here.

The combustion gas discharged from the combustor structure 1 is introduced to the turbine 40. The turbine 40 is moved rotationally by the combustion gas. Then, the generator 41 is driven by the rotation of the turbine 40 to generate electricity.

The combustion gas discharged from the combustor structure 1, which is mentioned here, is one containing a combustion product produced from the fuel and the oxygen and the carbon dioxide circulating to the combustor structure 1.

The combustion gas discharged from the turbine 40 is guided to the pipe 31 and cooled by passing through the heat exchanger 42. At this time, the oxygen flowing through the pipe 21 and the carbon dioxide flowing through the pipe 31 and circulating to the combustor structure 1, which are previously described, are heated by heat release from the combustion gas.

The combustion gas having passed through the heat exchanger 42 passes through the condenser 32. The combustion gas passes through the condenser 32, and thereby the water vapor contained in the combustion gas is removed therefrom. Note that the water vapor in the combustion gas condenses into water by passing through the condenser 32. The water is discharged through the pipe 36 to the outside, for example.

Here, as described previously, since the flow rates of the fuel and the oxygen are regulated so as to have the stoichiometric mixture ratio (equivalence ratio 1), most of components of the combustion gas from which the water vapor has been removed (dry combustion gas) are carbon dioxide.

The carbon dioxide is pressurized by the compressor 33 interposed in the pipe 31 to become the supercritical $CO_2$. A part of the carbon dioxide pressurized by the compressor 33 flows through the pipe 31 to be circulated to the combustor structure 1. At this time, the supercritical $CO_2$ is heated to, for example, about 700° C. by passing through the heat exchanger 42.

On one hand, the remainder of the carbon dioxide pressurized by the compressor 33 is introduced to the pipe 34 branching from the pipe 31. The carbon dioxide introduced to the pipe 34 is discharged to the outside after its flow rate is regulated by the flow rate regulating valve 35. The carbon dioxide discharged to the outside is utilized for the EOR (Enhanced Oil Recovery) employed at the oil drilling field, for example.

Next, the action in the combustor structure 1 will be described in reference to FIG. 2 and FIG. 3.

As illustrated in FIG. 2, the fuel supplied from the pipe 11 to the fuel supply part 52 is ejected from the outlet 52a into the combustor liner 51. The oxygen supplied from the pipe 21 to the oxidant supply part 53 and the supercritical $CO_2$ supplied from the pipe 31 to the oxidant supply part 53 are mixed in the oxidant supply part 53 and ejected from the outlet 53a into the combustor liner 51. At this time, the swirling component is imparted to the flow of the oxidant by the swirler 55 provided at the outlet 53a.

The fuel and the oxidant ejected into the combustor liner 51 are ignited by an ignition device (not illustrated), thereby starting the combustion. Note that the ignition device is provided in each of the combustors 50.

As illustrated in FIG. 2, in the combustor liner 51, flame is formed downstream from the fuel-oxidant supply mechanism 54. A combustion reaction is completed in the combustor liner 51. Hence, most of the combustion gas discharged from an outlet of the combustor liner 51 is composed of carbon dioxide and water vapor without containing the oxygen and the fuel.

The combustor 50 includes one combustor liner 51 and one fuel-oxidant supply mechanism 54, thereby eliminating interference with other flames (other flow fields). Hence, the oxygen and the fuel can be stably combusted.

The supercritical $CO_2$ supplied around the combustor structure 1 from the pipe 31 is introduced through the introduction holes 51c of the combustor liner 51 into the combustor liner 51 as the cooling medium.

The supercritical $CO_2$ introduced into the combustor liner 51 is discharged from the outlet of the combustor liner 51 together with the combustion gas to flow into the rear liner 60.

Note that the above-described action occurs in the combustors 50.

Flows of the combustion gases (containing the supercritical $CO_2$) discharged from the combustor liners 51 of the combustors 50 united with one another in the rear liner 60, and flow while being straightened in the rear liner 60.

Further, the supercritical $CO_2$ supplied around the combustor structure 1 from the pipe 31 is introduced through the introduction holes 62 of the rear liner 60 into the rear liner 60 as the cooling medium.

The supercritical $CO_2$ introduced into the rear liner 60 flows into the scroll 70 together with the combustion gas.

The flow of the combustion gas (containing the supercritical $CO_2$) flowing into the bent flow path portion 71 of the scroll 70 is biased to about 90 degrees in the axial direction of the turbine rotor 97. Then, the combustion gas whose flow is biased flows into the annular flow path portion 72. The combustion gas flowing into the annular flow path portion 72 expands in the circumferential direction of the turbine rotor 97. The flow of the combustion gas has a nearly uniform velocity distribution in an annular flow path of the annular flow path portion 72 surrounding the turbine rotor 97.

Then, the combustion gas is ejected from the outlet 73 of the scroll 70 toward the first-stage stator blade 95. At this time, the combustion gas is ejected at nearly uniform velocity from the annular outlet over the circumferential direction.

Note that as described above, the combustion gas flowing in the combustor structure 1 is guided to the turbine 40 to operate the turbine 40.

(Evaluation of Equivalence Ratio and Combustion Efficiency)

Figure 5:
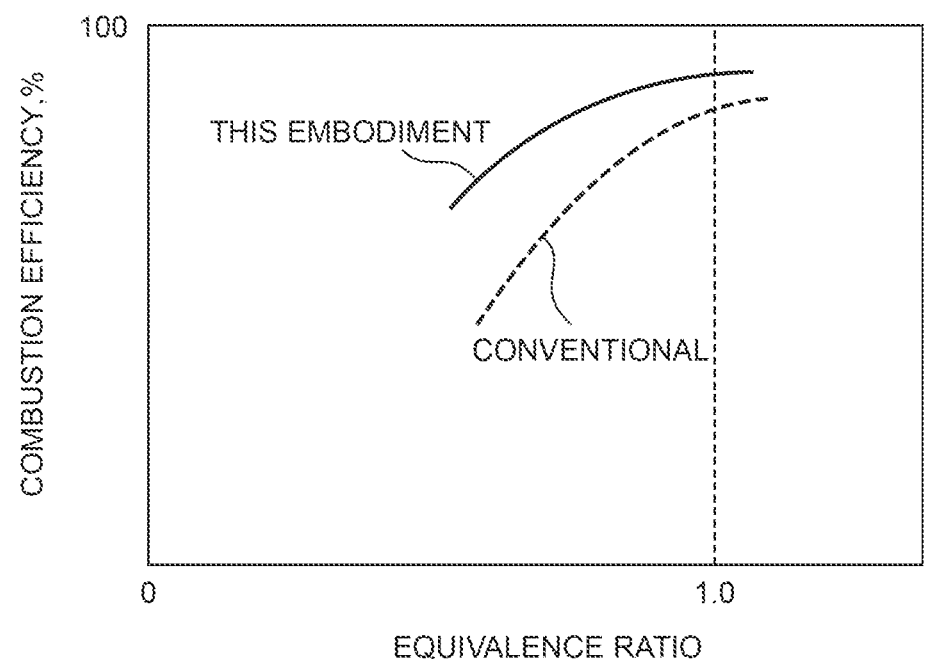
FIG. 5 is a graph illustrating relationships between an equivalence ratio and combustion efficiency in combustors of this embodiment and a conventional combustor illustrated in FIG. 7.
Figure 7:
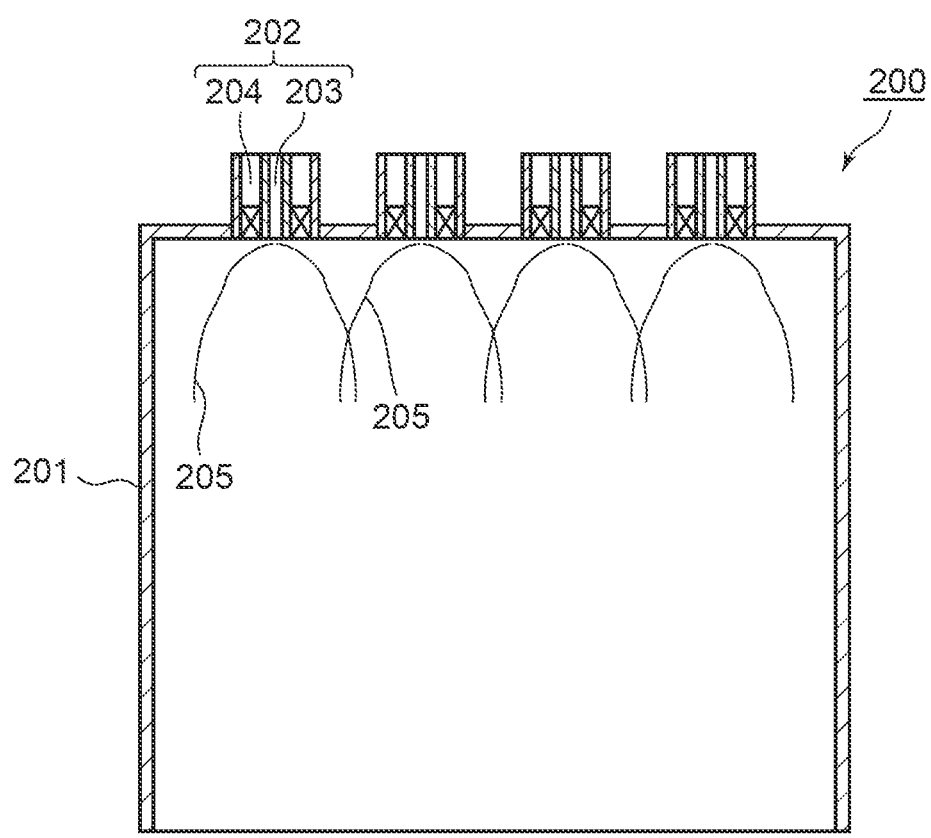
FIG. 7 is a view schematically illustrating a longitudinal section of a conventional vertical silo-type combustor providing a diffusion combustion-system.

Here, FIG. 5 is a graph illustrating relationships between an equivalence ratio and combustion efficiency in the combustors 50 of this embodiment and a conventional combustor 200 (vertical silo-type combustor 200) illustrated in FIG. 7.

The combustion efficiency illustrated in FIG. 5 is obtained on the basis of combustion gas composition. The results illustrated in FIG. 5 are data when conditions of a temperature and a pressure at inlets of the combustors are set as supercritical conditions of $CO_2$. Note that the fuel was natural gas and the oxidant was a mixed gas of oxygen and supercritical $CO_2$. Both data are obtained under the same conditions except that combustor structures are different.

In the combustor 50 of this embodiment, in one space in one combustor liner 51, the fuel and the oxidant ejected from one fuel-oxidant supply mechanism 54 are combusted. Then, in the combustor 50 of this embodiment, a plurality of combustors 50 each as described above are included.

On the other hand, in the conventional combustor 200, in one space in one combustor liner 201, fuel and an oxidant ejected from a plurality of fuel-oxidant supply mechanisms 202 are combusted. Note that the number of the fuel-oxidant supply mechanisms 202 in the conventional combustor 200 was set to the same number as those of the combustors 50 of this embodiment.

As illustrated in FIG. 5, in the entire range of the varied equivalence ratio, the combustion efficiency in the combustors 50 of this embodiment is higher than the combustion efficiency in the conventional combustor 200.

With the equivalence ratio decreasing to less than 1, the conventional combustor 200 is larger than the combustors 50 of this embodiment in a decrease in combustion efficiency. That is, a difference in combustion efficiency between the combustors 50 of this embodiment and the conventional combustor 200 becomes larger with the equivalence ratio decreasing to less than 1.

From the results in FIG. 5, in the conventional combustor 200, it is considered that a concentration of unburnt components of CO and THC in the combustion gas discharged from the combustor 200 increases and the combustion efficiency decreases. Hence, in the conventional combustor 200, it is considered that a downstream flow field of one fuel-oxidant supply mechanism 202 is disturbed by downstream flow fields of the adjacent fuel-oxidant supply mechanisms 202 and a flame 205 becomes unstable.

Here, a recirculation flow formed by the flow of the oxidant having the swirling component contributes to forming stable flames. However, in the conventional combustor 200, it is considered that the flow field caused by the recirculation flow is disturbed and the flame 205 becomes unstable.

On the other hand, in the combustors 50 of this embodiment, it is considered that a concentration of unburnt components in the combustion gas discharged from the combustors 50 is low and high combustion efficiency is obtained. Hence, in the combustors 50 of this embodiment, it is considered that stable combustion is maintained.

In the combustors 50 of this embodiment, even when the equivalence ratio varies to less than 1, the decrease in combustion efficiency is suppressed.

As described above, in the combustor 50 in the combustor structure 1 of this embodiment, in one space in one combustor liner 51, the fuel and the oxidant ejected from one fuel-oxidant supply mechanism 54 are combusted, thereby allowing stable flame to be formed downstream from the fuel-oxidant supply mechanism 54.

Further, in the oxidant in this embodiment, the oxidant contains the supercritical $CO_2$ making no contribution to combustion. Hence, when the mixed gas containing the supercritical $CO_2$ as the oxidant is used, the flames are likely to be more unstable by disturbing the flow fields as compared with use of pure oxygen as the oxidant. However, as described above, in the combustors 50 of this embodiment, since the stable flames can be obtained without disturbing the flow fields, stable combustion can be maintained even though the oxidant contains the supercritical $CO_2$.

In the combustor 50 of this embodiment, including such a plurality of combustors 50 makes it possible to satisfy a heat quantity required for the supercritical $CO_2$ gas turbine. Further, it is possible to appropriately adjust the number of the combustors 50 to be installed depending on the heat quantity required by the supercritical $CO_2$ gas turbine.

Further, in a development stage of a combustor, it is general to conduct a basic test on a small-sized test combustor on the assumption that an actual machine is mounted. However, when findings obtained in the small-sized test combustor are applied to an actual machine-level large-sized combustor, an effect of a dimension or the like often does not conform to the law of similarity. In such a case, the findings obtained in the small-sized test combustor cannot be effectively used.

The combustor structure 1 of this embodiment is constituted by including the plurality of combustors 50 at a level of the small-sized test combustor. That is, it is possible to use the findings obtained in the small-sized test combustor as they are.

Here, in this embodiment described above, one example of including the combustor structure 1 on the upper half side is indicated, but this configuration is not restrictive.

Figure 6:
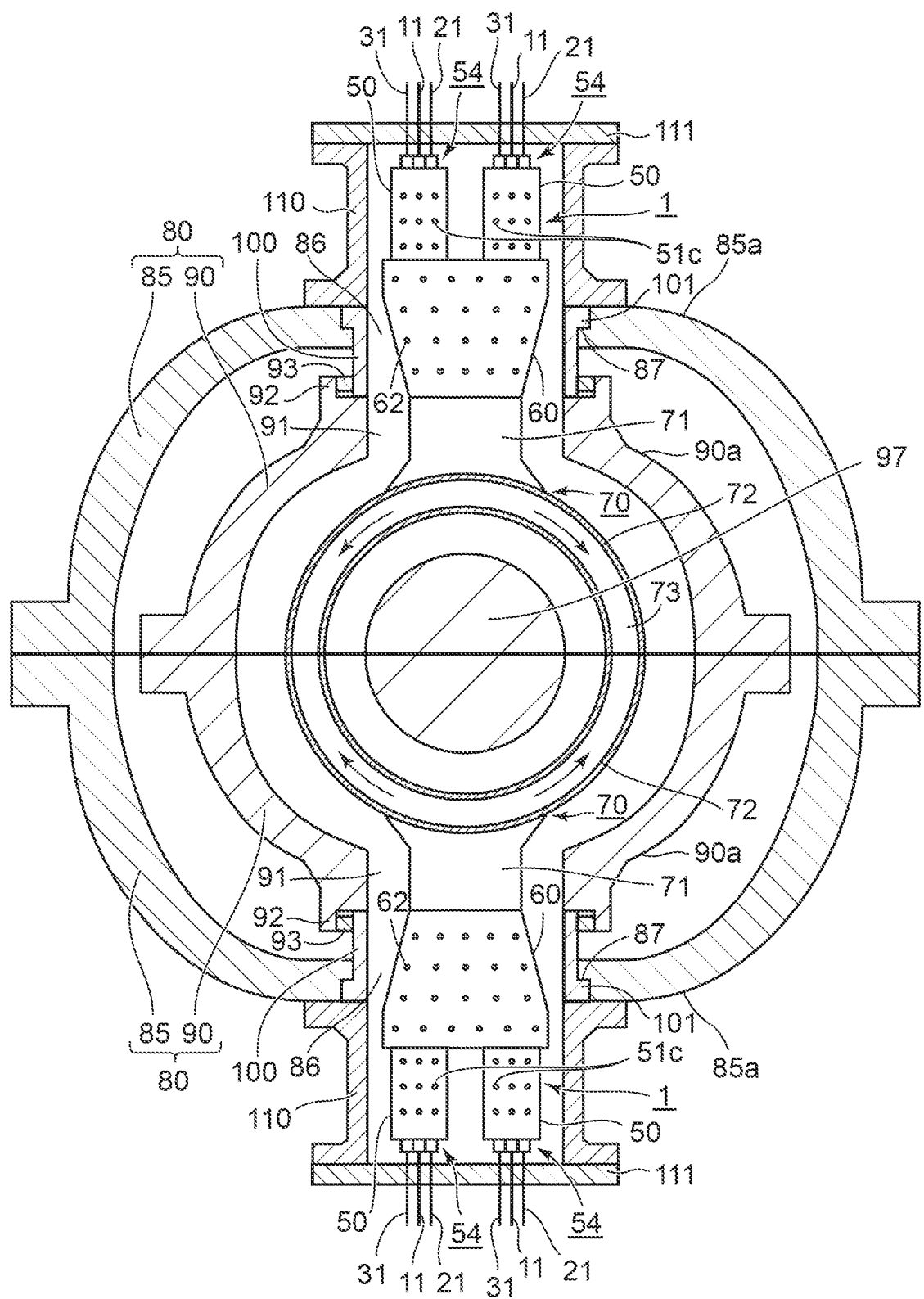
FIG. 6 is a view illustrating a cross section corresponding to the A-A cross section in FIG. 2 when the combustor structures of the embodiment are provided on an upper half side and a lower half side.

FIG. 6 is a view illustrating a cross section corresponding to the A-A cross section in FIG. 2 when the combustor structures 1 of the embodiment are provided on the upper half side and the lower half side.

As illustrated in FIG. 6, the combustor structures 1 may be included on both the upper half side and the lower half side. In this case, on the upper half side, the combustor structure 1 is disposed to penetrate the outer casing 85 and the inner casing 90 from a vertically upper side, for example.

On the lower half side, the combustor structure 1 is disposed to penetrate the outer casing 85 and the inner casing 90 from a vertically lower side, for example.

Further, although no illustration is given, a configuration to include the combustor structure 1 only on the lower half side is applicable.

According to the above-described embodiment, in the combustors of the supercritical $CO_2$ gas turbine, it becomes possible to maintain the stable combustion without being subjected to interference from the flow fields of the fuel and the oxidant ejected from other fuel-oxidant supply mechanisms.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A supercritical $CO_2$ gas turbine which uses supercritical $CO_2$ for a working fluid, comprising:
    a turbine casing;
    a turbine rotor penetrating horizontally through the turbine casing;
    a combustor structure penetrating the turbine casing perpendicularly to an axial direction of the turbine rotor from a vertically upper side of the turbine casing or a vertically lower side of the turbine casing; and
    a combustor casing fixed on the turbine casing perpendicularly to the axial direction of the turbine rotor at the vertically upper side or the vertically lower side, the combustor casing surrounding the combustor structure, the combustor casing being constituted by a cylindrical casing with a central axis perpendicular to the axial direction of the turbine rotor;
    the combustor structure comprising:
    a plurality of combustors enclosed within the combustor casing, the plurality of combustors being arranged circumferentially around the central axis of the combustor casing,
    each combustor of the plurality of combustors comprising:
    a combustor liner in a cylindrical shape, which combusts fuel and an oxidant, the combustor liner having a center axis which is perpendicular to the axial direction of the turbine rotor;
    a fuel supply provided at an upstream end of the combustor liner, the fuel supply being configured to supply the fuel into the combustor liner; and
    an oxidant supply provided at the upstream end of the combustor liner, the oxidant supply being configured to supply the oxidant into the combustor liner.

2. The supercritical $CO_2$ gas turbine according to claim 1, wherein the fuel supply and the oxidant supply constitute one fuel-oxidant supply.

3. The supercritical $CO_2$ gas turbine according to claim 1, further comprising a rear liner having an upstream end provided with the plurality of combustors and in which a combustion gas discharged from the combustor liner of each of the plurality of combustors is gathered and made to flow.

4. The supercritical $CO_2$ gas turbine according to claim 2, further comprising a rear liner having an upstream end provided with the plurality of combustors and in which a combustion gas discharged from the combustor liner of each of the plurality of combustors is gathered and made to flow.

5. The supercritical $CO_2$ gas turbine according to claim 3, further comprising a flow path which is connected to a downstream end of the rear liner and through which the combustion gas discharged from the rear liner is guided in the axial direction of the turbine rotor and guided in a circumferential direction of the turbine rotor.

6. The supercritical $CO_2$ gas turbine according to claim 4, further comprising a flow path which is connected to a downstream end of the rear liner and through which the combustion gas discharged from the rear liner is guided in the axial direction of the turbine rotor and guided in a circumferential direction of the turbine rotor.

7. The supercritical $CO_2$ gas turbine according to claim 1, wherein the oxidant is a mixed gas of oxygen and the supercritical $CO_2$.

8. The supercritical $CO_2$ gas turbine according to claim 1, wherein the turbine casing includes an inner casing and an outer casing provided on an outer peripheral side of the inner casing.

\* \* \* \* \*